United States Patent
Ooe

[11] Patent Number: 4,819,305
[45] Date of Patent: Apr. 11, 1989

[54] LINE HOOK FOR FISHING FLOAT

[76] Inventor: Kishiro Ooe, 404-1, Oaza-shimizu; Iwade-cho, Naga-gun, Wakayama-ken, Japan

[21] Appl. No.: 77,729

[22] Filed: Jul. 27, 1987

[51] Int. Cl.$^4$ .................. A44B 13/02; A01K 91/04
[52] U.S. Cl. .................... 25/237; 24/131 C; 43/44.83
[58] Field of Search .............. 24/237, 3 D, 131 R, 24/131 C, 129 C, 67.9; 43/44.83, 43.6, 43.13, 43.14

[56] References Cited
U.S. PATENT DOCUMENTS

| | | | |
|---|---|---|---|
| 415,030 | 11/1889 | Dillard | 24/237 |
| 1,283,557 | 11/1918 | Raschick | 24/3 D |
| 1,728,560 | 9/1929 | Goshorn | 24/237 |
| 2,074,841 | 3/1937 | Haimowitz | 24/237 |
| 3,277,549 | 10/1966 | Bradshaw | 24/237 |
| 3,633,253 | 1/1972 | Ellis | 24/67.9 |
| 4,114,829 | 9/1978 | Boehler | 24/131 C |
| 4,231,140 | 11/1980 | Ebreo et al. | 24/237 |
| 4,301,575 | 11/1981 | Goldberg | 24/3 D |
| 4,696,120 | 9/1987 | Schroeder | 24/237 |

Primary Examiner—Victor N. Sakran
Attorney, Agent, or Firm—Edwin E. Greigg

[57] ABSTRACT

A line hook for a fishing float comprises a wire which is bent to form long circles and another circle. The long circles are formed to insert therein a line and the other circle is made for inserting therein a ring of a float so as to easily set the float on the line without cutting off the line. At least one end of the wire is bent to cross the said another circle in order to control the ring of the float so that the ring may be prevented from engaging the proper portions of the long circles.

1 Claim, 2 Drawing Sheets

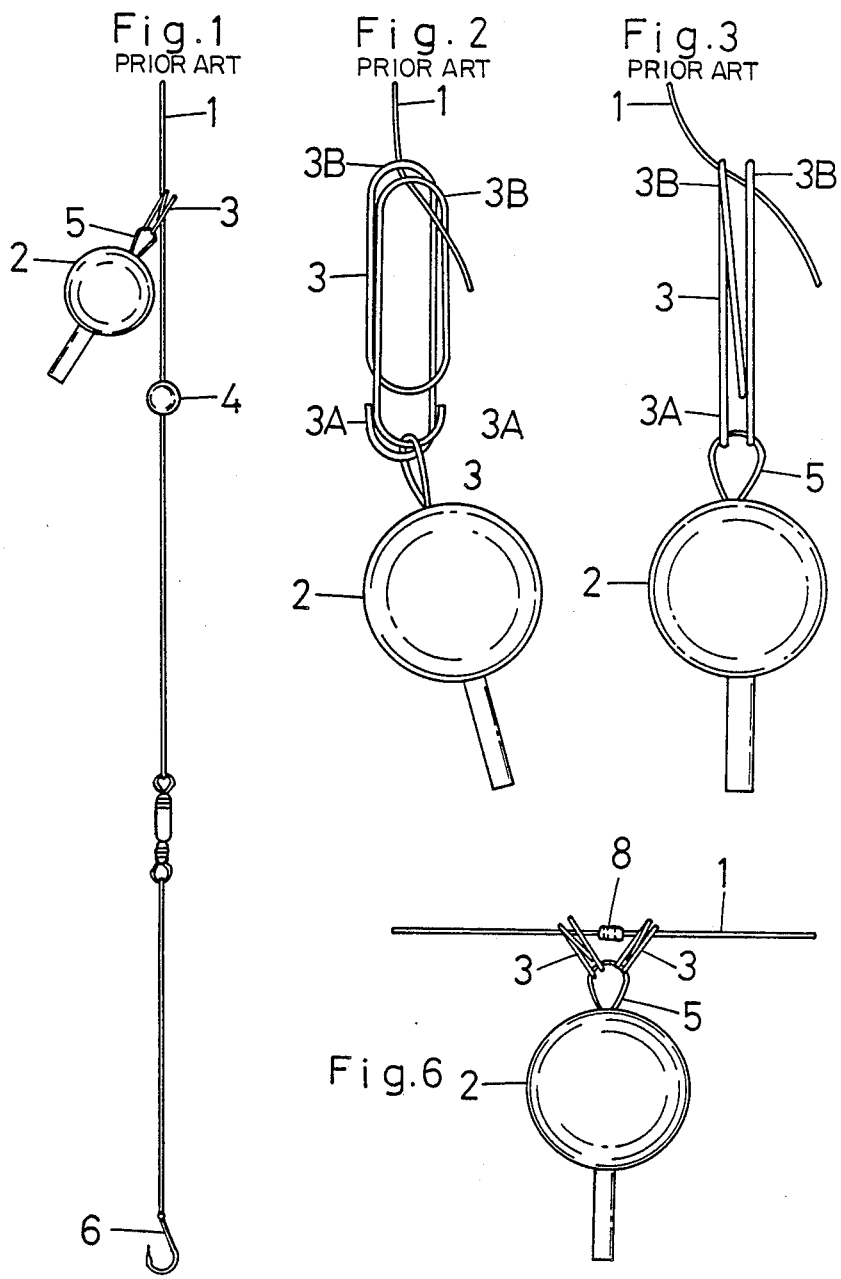

LINE HOOK FOR FISHING FLOAT

BACKGROUND OF THE INVENTION

This invention relates to a line hook for a fishing float. When fishing, where the depth of water of swimming fishes is different due to the time of wondering or the sort of the fish, it is necessary to adjust the position of a hook beneath the water by moving a fishing float along a line. Conventionally, it is used such a construction that a line is directly inserted into a ring which is fixed to a movable float when the movable float is mounted on the line. In such a construction, where it becomes necessary to change the float for another big, small, heavy or light float, it is very troublesome to mount or set another one on the line since the line should be once cut off in order to insert the line in the ring of the new float. Further, it is known such a construction that the float is attached to a small plastic ball and a line is inserted into an opening of the ball. In such a case, however, it is confusing since the small ball flows due to the resistance by the flowing water and a pulling force, which is not a tug by a fish, acts on the line.

To solve such conventional problems, this inventor has once proposed a line hook for a fishing float which comprises a wire which is wound two times to form slightly long circles, both ends of the wire being extended at one side of the long circles and bent in opposite directions to each other to form another long circle so as to be able to insert a line and a ring of the fishing float into and disengage the long circles through a clearance between one of the ends of the wire and the proper portion of the wire by utilizing elasticity of the wire. This line hook for the fishing float will now be described with reference to FIG. 1 through FIG. 4.

A wire 3 of stainless steel is wound two times to form slightly long (elliptic) circles. The both ends 3A and 3A of the wire 3 are extended at one side of the long circles and bent to form another circle. Turning portions 3B and 3B of the long circles are made uniform. A line 1 and a ring 5 of a fishing float 2 are inserted into the long circles through a clearance between one of the ends 3A and 3A and a porper portion 3D of the wire 3.

Next, the line hook is set on the line 1 by taking the following steps.

First, the line 1 is hooked on one end 3A of the line hook and then the wire 3 is turned in the direction of wind of the long circles so that the line 1 may be finally inserted into the long circles and is not longer come off(FIGS. 2 and 3).

Next, the float 2 is set on the line hook by taking the following steps. Namely, the ring 5 of the float 2 is hooked on both of the ends 3A and 3A of the line hook at the same time. As the result, the float 2 is set on the line hook as shown in FIGS. 2 and 3, and does not come off without artificial forces.

As mentioned above, the line hook for the fishing float has the following advantages.

It is very easy to set the line hook on the line and the fishing float on the line hook and also disengage the line hook from the line and the fishing float from the line hook and there needs a little time for such a treatment. It is not necessary to cut off the line for changing the fishing float to another one. Further, a tension force due to resistance of the water does not act on the line since the line hook is very small in size. This means that it may distinguish a tug from the tension force.

Further, the fishing float may be moved smoothly even if the line is curled since the line hook is made to form a long circle which allows the line to move free.

Moreover, the line hook is very small in size (about 5 mm –15 mm) and may be manufactured by using a wire only. Therefore, it is very simple in construction and it is possible to lower the manufacturing cost considerably.

However, the above-mentioned line hook has the following problems.

Namely, when fishing, the position of the ring 5 of the fishing float 2 is sometimes shifted due to inertia at the time of throwing the line or due to shock at the time of hitting on the water and then the ring 5 is engaged between one of the end 3A and the proper portion 3D so that it looses a free-movement of the ring 5 against the line hook. As the result, buoyancy of the float 2 acting on the line functions as a twisting force so that the float 2 cannot be moved smoothly to a predetermined position.

SUMMARY OF THE INVENTION

An object of this invention is to give full play to a fishing float which moves free while making good use of the function of a line hook for the fishing float by solving the problems of the conventional line hook referred to hereinabove.

To solve the conventional problems and achieve the above object, the line hook for the fishing float according to this invention comprises a wire which is wound two times to form slightly long circles, both ends of the wire being extended at one side of the long circles and bent in opposite directions to one another to form another long circle so as to be able to insert a line and a ring of a fishing float into and disengaged from the long circles through a clearance between one of the end of the wire and a proper portion thereof by using elasticity of the wire, wherein at least one of the ends of the wire is bent greatly to cross said another long circle to make a ring control portion.

Accordingly, once the ring is inserted into the said another circle, the ring is no longer engaged between the end of the wire and the proper portion thereof even if the ring is moved due to inertia at the time of throwing of the line or due to shock at the time of hitting on the water as the ring control portion controls the movement of the ring and prevents the ring from engaging with the end and the proper portion of the wire.

Therefore, the ring may be always moved free from the line hook and the fishing float is allowed to move to a predetermined position on the line. As the result, a tug by a fish may be easily distinguished with a tension force which would act on the line in the event that the float stops at an unexpected position due to twisting forces caused by engagement of the ring of the float with the line hook.

Further, it may prevent the fishing float from entangling with the line hook since the ring of the float may be moved free and the float is free from resistance of the flowing water.

Other advantages of this invention will be apparent from the following description with reference to the accompanying drawings.

BRIEF DESCRIPTION OF THE DRAWINGS

The drawings show embodiments of a line hook for a fishing float according to this invention in which:

FIG. 1 is a perspective view showing a state of use of a conventional line hook for a fishing float in which a line is inserted, FIG. 2 is a perspective and enlarged view of the line hook in FIG. 1, FIG. 3 is a side view of the line hook in FIG. 2, FIG. 6 is an entire side view of the line hook showing another example of use.

DETAILED DESCRIPTION OF THE PREFERRED EMBODIMENTS

Figure 5:
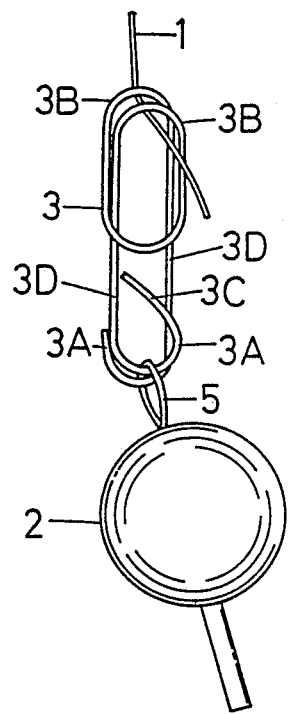
FIG. 5 is an entire front view showing the line hook for the fishing float according to this invention.
Figure 4:
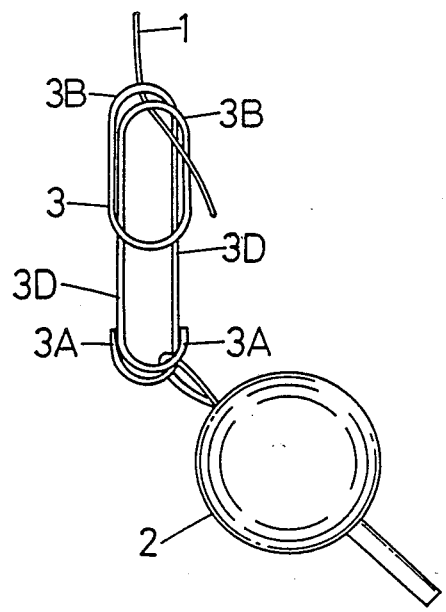
FIG. 4 is a front view showing the function of the line hook in the prior art.

FIG. 5 shows an embodiment of a line hook for a fishing float according to this invention. A wire 3 is wound two times to form slightly long circles, both ends of the wire 3 being extended at one side of the long circles and bent in opposite direction to each other to form another long circle so as to be able to insert a line 1 and a ring 5 of a fishing float 2 into the long circles through a clearance between one of the end of the wire 3 and a proper portion 3D thereof by using elasticity of the wire 3. The both ends of the wire 3 are given numerals 3A and 3A. The wire 3 in this embodiment is partly improved. Namely, the end 3A is extended inclinedly to form an inclining portion 3C which functions as a ring control portion. Therefore, once the ring 5 is hooked on a predetermined position of the wire 3, even if the ring 5 tends to move up and down due to shock caused by hitting upon the water surface at the time of throwing of the line 1 or due to buoyancy of the float 2, the inclining portion or ring control portion 3C controls the movement of the ring 5 (FIG. 5). As the result, the ring control portion 3C prevents the float 2 from fixing its position between the end 3A and the proper portion 3D of the wire 3 or from taking undesirable posture due to engagement of the ring 5 between the end 3A and the proper portion 3D.

The wire 3 used in this invention may be made of suitable materials which have elasticity, such as steel stainless steel and the like.

Further, the inclining portion 3C (a ring control portion) may be improved to have its end 3A which extends slightly cross the proper portion 3D so as to achieve the object of this invention.

Another embodiment of a line hook for a fishing float according to this invention will be described below with reference to FIG. 6. This embodiment only shows another state or way of use of the line hook. As shown in FIG. 6, to fix the float 2 on the line 1 at a predetermined position, a stopper 8 is secured to the line 1 which stopper is bigger than long circles of the wire 3, and then a pair of the line hooks are located on the right and left sides of the stopper through the line 1, and thereafter the ring 5 of the float 2 is inserted into both of the other circles of the two line hooks by bridging same in the same manner as mentioned hereinbefore. This arrangement of the line hooks stops the float 2 on the line 1 at a position as the line hooks cannot be moved by the stopper 8. This is utilized when the float is required to be used as a fixed-position float.

What is claimed is:

1. A line hook for a fishing float which comprises an elongated wire of spring steel having first and second ends, said wire is wound two times substantially at its middle section to form first and second ovals, said first end of the wire including a first proper portion extending from said first oval, said second end of the wire including a second proper portion extending from said second oval, said first proper portion being longer than said second proper portion, said first and said second proper portions of the wire being extended at one side of said first and second long ovals and spaced from each other, said first and second ends bent to face in opposite directions to one another to form a third long oval, said first end of said first proper portion of the wire bent greatly to cross said third long oval to form a ring control portion having a tip end, said ring control portion being bent inclinedly to cross said second proper portion slightly with the tip end of the ring control portion extending across the space between said first and second proper portions ending close to said first proper portion, in a rest position, whereby a line and a ring of a fishing float may be inserted into and disengaged from said third long oval through a clearance between said first and second ends of the wire and said first and second proper portions thereof by using elasticity of the wire.

* * * * *